US010156224B2

(12) United States Patent
Chacon et al.

(10) Patent No.: US 10,156,224 B2
(45) Date of Patent: Dec. 18, 2018

(54) SYSTEM AND METHOD FOR CONTROLLING A WIND TURBINE

(71) Applicant: General Electric Company, Schenectady, NY (US)

(72) Inventors: Joseph Lawrence Chacon, Greenville, SC (US); Kristina Anne Gerber, Charleston, SC (US); Noah Pennington, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 672 days.

(21) Appl. No.: 14/656,763

(22) Filed: Mar. 13, 2015

(65) Prior Publication Data

US 2016/0265510 A1 Sep. 15, 2016

(51) Int. Cl.
*F03D 7/02* (2006.01)
*F03D 7/04* (2006.01)
*F03D 17/00* (2016.01)

(52) U.S. Cl.
CPC ......... *F03D 7/0228* (2013.01); *F03D 7/0224* (2013.01); *F03D 7/04* (2013.01); *F03D 7/046* (2013.01); *F03D 7/047* (2013.01); *F03D 17/00* (2016.05); *F05B 2270/802* (2013.01); *Y02E 10/723* (2013.01)

(58) Field of Classification Search
None
See application file for complete search history.

(56) References Cited

U.S. PATENT DOCUMENTS 7,071,579 B2 * 7/2006 Erdman ................ F03D 7/0284
290/44
7,896,614 B2 * 3/2011 Fisher ....................... F03D 7/00
416/1

(Continued)

FOREIGN PATENT DOCUMENTS

EP 2 458 204 A1 5/2012
WO 2009/071882 A2 6/2009

OTHER PUBLICATIONS

Bakka, T.; Karimi, H.R. and Christiansen, S., "Linear Parameter-Varying Modelling and Control of an Offshore Wind Turbine with Constrained Information", Sep. 18, 2013, IET Control Theory Applications.*

(Continued)

*Primary Examiner* — Mohammad Ali
*Assistant Examiner* — Kelvin Booker
(74) *Attorney, Agent, or Firm* — Dority & Manning, P.A.

(57) ABSTRACT

Systems and methods for controlling a wind turbine based on sensor readings are provided. A signal path between a sensor and a turbine controller can be modified and a secondary controller can be inserted between the turbine controller and the sensor. The secondary controller can receive a signal from the sensor and adjust the signal to an adjusted signal. The adjusted signal can be communicated to the turbine controller which can control operation of the wind turbine based at least in part on the adjusted signal. In this way, the operation of the wind turbine based on various sensor readings can be adjusted to provide for increased energy production without requiring access to computer-readable instructions, such as source code, implemented by the wind turbine controller.

17 Claims, 6 Drawing Sheets

(56) References Cited

U.S. PATENT DOCUMENTS

| | | | |
|---|---|---|---|
| 8,025,476 B2* | 9/2011 | Zheng | F03D 7/0224 415/1 |
| 8,047,770 B2* | 11/2011 | Braicks | F03D 7/0248 415/123 |
| 8,120,194 B2* | 2/2012 | Hoffmann | H02P 9/04 290/44 |
| 8,190,394 B2* | 5/2012 | Davis | F03D 80/70 702/179 |
| 8,226,347 B2* | 7/2012 | Bywaters | F03D 7/0296 415/1 |
| 8,430,632 B2 | 4/2013 | Haag | |
| 8,434,360 B2 | 5/2013 | Cheng | |
| 8,789,274 B2* | 7/2014 | Bywaters | H02K 7/1838 254/278 |
| 8,803,352 B1 | 8/2014 | Koerber et al. | |
| 9,093,928 B2* | 7/2015 | Larsen | H02P 9/00 |
| 9,127,642 B2* | 9/2015 | Zhu | F03D 7/0288 |
| 9,163,611 B2* | 10/2015 | Santiago Benito | F03D 7/0224 |
| 9,188,104 B2* | 11/2015 | Bowyer | F03D 7/0284 |
| 9,341,159 B2* | 5/2016 | Koerber | F03D 7/0224 |
| 9,347,432 B2* | 5/2016 | Herrig | F03D 7/0296 |
| 9,377,007 B2* | 6/2016 | Zhu | F03D 7/043 |
| 9,551,322 B2* | 1/2017 | Ambekar | F03D 17/00 |
| 9,638,171 B2* | 5/2017 | Huang | F03D 7/0276 |
| 9,845,789 B2* | 12/2017 | Noto | F03D 7/048 |
| 9,926,910 B2 | 3/2018 | Chacon et al. | |
| 10,031,535 B2* | 7/2018 | Rollins | F04D 27/004 |
| 2009/0160187 A1* | 6/2009 | Scholte-Wassink | F03D 7/0284 290/44 |
| 2010/0135789 A1* | 6/2010 | Zheng | F03D 7/0224 416/1 |
| 2010/0135798 A1* | 6/2010 | Eggleston | F03D 7/0296 416/36 |
| 2010/0143117 A1* | 6/2010 | Xiong | F03D 7/0296 416/1 |
| 2010/0143129 A1* | 6/2010 | Fisher | F03D 7/00 416/61 |
| 2010/0158688 A1* | 6/2010 | Benito | F03D 17/00 416/39 |
| 2010/0259046 A1* | 10/2010 | Kota | F03D 1/0641 290/44 |
| 2011/0064573 A1* | 3/2011 | Viripullan | F03D 7/024 416/1 |
| 2011/0135443 A1* | 6/2011 | Cucci | F03D 3/02 415/1 |
| 2011/0137474 A1* | 6/2011 | Larsen | F03D 7/0284 700/287 |
| 2011/0142594 A1* | 6/2011 | Dinjus | F03D 7/0224 415/4.3 |
| 2011/0142624 A1* | 6/2011 | Vadari | F03D 7/0224 416/1 |
| 2011/0148113 A1* | 6/2011 | Li | F03D 7/02 290/44 |
| 2011/0229322 A1* | 9/2011 | Tadayon | F03D 1/065 416/91 |
| 2011/0309621 A1 | 12/2011 | Nielsen et al. | |
| 2012/0004781 A1* | 1/2012 | Santos | F03D 7/0284 700/287 |
| 2012/0056426 A1* | 3/2012 | Van Kuik | F03D 7/0224 290/44 |
| 2013/0079945 A1* | 3/2013 | Achilles | H02J 3/1892 700/298 |
| 2013/0094960 A1* | 4/2013 | Bowyer | F03D 7/042 416/1 |
| 2013/0094961 A1* | 4/2013 | Couchman | F03D 7/042 416/1 |
| 2013/0110414 A1* | 5/2013 | Caponetti | F03G 7/00 702/35 |
| 2013/0154263 A1* | 6/2013 | Attia | H02P 9/007 290/44 |
| 2013/0193686 A1 | 8/2013 | Perley et al. | |
| 2013/0277970 A1* | 10/2013 | Dange | F03D 7/026 290/44 |
| 2013/0297085 A1* | 11/2013 | Xiongzhe | F03D 7/0276 700/287 |
| 2014/0015252 A1* | 1/2014 | Zhu | F03D 7/0288 290/44 |
| 2014/0043080 A1* | 2/2014 | Larsen | H02J 3/44 327/243 |
| 2014/0103652 A1* | 4/2014 | Ubben | F03D 7/048 290/44 |
| 2014/0103653 A1* | 4/2014 | Ubben | F03D 7/048 290/44 |
| 2014/0203563 A1* | 7/2014 | Bowyer | F03D 7/0284 290/44 |
| 2015/0050143 A1* | 2/2015 | Kammer | F03D 11/0091 416/1 |
| 2015/0118047 A1* | 4/2015 | Yoon | F03D 11/0091 416/1 |
| 2015/0260159 A1* | 9/2015 | Jimenez Buendia | F03D 7/0276 290/44 |
| 2015/0260160 A1* | 9/2015 | Melius | F03D 7/042 416/47 |
| 2015/0316032 A1* | 11/2015 | Drack | F03D 7/0296 416/1 |
| 2016/0025072 A1* | 1/2016 | Monteiro De Barros | F03D 11/02 415/121.3 |
| 2016/0115942 A1* | 4/2016 | Noto | F03D 17/00 290/44 |
| 2016/0265512 A1* | 9/2016 | Chacon | F03D 7/042 |

OTHER PUBLICATIONS

Barlas, T.K. and van Kuik, G.A.M., "Review of State of the Art in Smart Motor Control Research for Wind Turbines", Sep. 15, 2009, Progress in Aerospace Sciences.*

Nourdine, S.; Camblong, H.; Vechiu, I. and Tapia, G., "Comparison of Wind Turbine LQG Controllers Using Individual Pitch Control to Alleviate Fatigue Loads", Jun. 23-25, 2010, 18$^{th}$ Mediterranean Conf on Control and Automation.*

Pao, L.Y. and Johnson, K.E., "Control of Wind Turbines, Approaches Challenges and Recent Developments", Apr. 2011, IEEE Control Systems Magazine.*

Pao, L.Y. and Johnson, K.E., "A Tutorial on the Dynamics and Control of Wind Turbines and Wind Farms", Jun. 10-12, 2009, 2009 American Control Conf.*

Saberi, A.; Salmasi, F.R. and Najafabadi, T.A., "Sensor Fault-Tolerant Control of Wind Turbine Systems", Jun. 10-11, 2014, 5$^{th}$ Conference on Thermal Power Plants (IPGC2014).*

Schlipf, D.; Grau, P.; Raach, S.; Duraiski, R.; Trierweiler, J. and Cheng, P.W., "Comparison of Linear and Nonlinear Model Predictive Control of Wind Turbines Using LIDAR", Jun. 4-6, 2014, 2014 American Control Conf. (ACC).*

Extended European Search Report and Opinion issued in connection with corresponding EP Application No. 16159306.6 dated Jul. 12, 2016.

* cited by examiner

SYSTEM AND METHOD FOR CONTROLLING A WIND TURBINE

FIELD OF THE INVENTION

The present subject matter relates generally to wind turbines and more particularly to systems and methods for adjusting signal readings for a wind turbine controller for energy production improvement.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

During operation of a wind turbine, various components of the wind turbine are subjected to various loads due to the aerodynamic wind loads acting on the blade. The blade loading is dependent on the wind speed, tip speed ratio and/or pitch setting of the blade. Tip speed ratio is the ratio of the rotational velocity of the blade tip to wind speed. It can be desirable to adjust operation of the wind turbine based on signals indicative of tip speed ratio (e.g. various speed readings) to adjust loading of the rotor blades of the wind turbine and/or to increase energy production of the wind turbine.

To reduce rotor blade loading, various methods and apparatus have been developed to allow the rotor blades to shed a portion of the loads experienced thereby. Such methods and apparatus include, for example, pitching the rotor blades and/or reducing generator torque during operation. Accordingly, many wind turbines include a wind turbine controller that can operate the wind turbine in various ways based on the tip speed ratio wind turbine loading. For instance, under various operating conditions, the wind turbine can adjust the torque of a generator and/or the pitch angle of the rotor blades to adjust the tip speed ratio to meet a desired tip speed ratio setpoint to increase energy capture by the wind turbine.

In certain instances, it can be desirable to adjust the performance (e.g. tip speed ratio setpoints) of the wind turbine controller to increase or enhance energy production. However, in some cases, it may be difficult to adjust the operation of turbine controller itself. For instance, the computer-readable instructions (e.g. source code) implemented by the turbine controller in executing various control routines may not be accessible or otherwise capable of being modified.

Accordingly, systems and methods for adjusting operation of a turbine control system based on tip speed ratio would be welcome in the technology. For example, systems and methods that allow for adjusting operation of a turbine controller based on tip speed ratio without requiring access or modification of computer-readable instructions implemented by the turbine controller would be particularly desirable.

BRIEF DESCRIPTION OF THE INVENTION

Aspects and advantages of embodiments of the present disclosure will be set forth in part in the following description, or may be learned from the description, or may be learned through practice of the embodiments.

One example aspect of the present disclosure is directed to a system for controlling a wind turbine. The system includes a sensor configured to provide a signal indicative of one or more parameters of a wind turbine and a turbine controller configured to control operations of the wind turbine. The system further includes a secondary controller inserted between the sensor and the turbine controller. The secondary controller is separated from the turbine controller by a distance. The secondary controller is configured to receive the signal from the sensor over a communication interface. The secondary controller is configured to adjust the signal based at least in part on a signal bias to an adjusted signal and to provide adjusted signal to the turbine controller.

Another example aspect of the present disclosure is directed to a method for controlling a wind turbine. The method includes modifying a signal path between a sensor and a wind turbine controller and inserting a secondary controller between the sensor and the wind turbine controller. The method further includes generating a signal indicative of parameter of the wind turbine with the sensor; receiving the signal at the secondary controller; determining, at the secondary controller, an adjusted signal that is different from the signal based at least in part on a signal bias; and providing the adjusted signal to the wind turbine controller Yet another example embodiment of the present disclosure is directed to a secondary controller for adjusting a speed signal provided by a speed sensor for communication to a wind turbine controller. The secondary controller includes a first interface configured to receive a speed signal indicative of a speed of one or more components of a wind turbine and a second interface configured to receive one or more signals associated with an input condition. The method further includes one or more processors and one or more memory devices. The one or more memory devices store computer-readable instructions that when executed by the one or more processors cause the one or more processors to perform operations. The operations include receiving the speed signal via the first interface and receiving one or more signals associated with the input condition via a second interface. The operations further include determining an adjusted speed signal that is different from the speed signal based at least in part on the input condition.

Variations and modifications can be made to these example embodiments of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
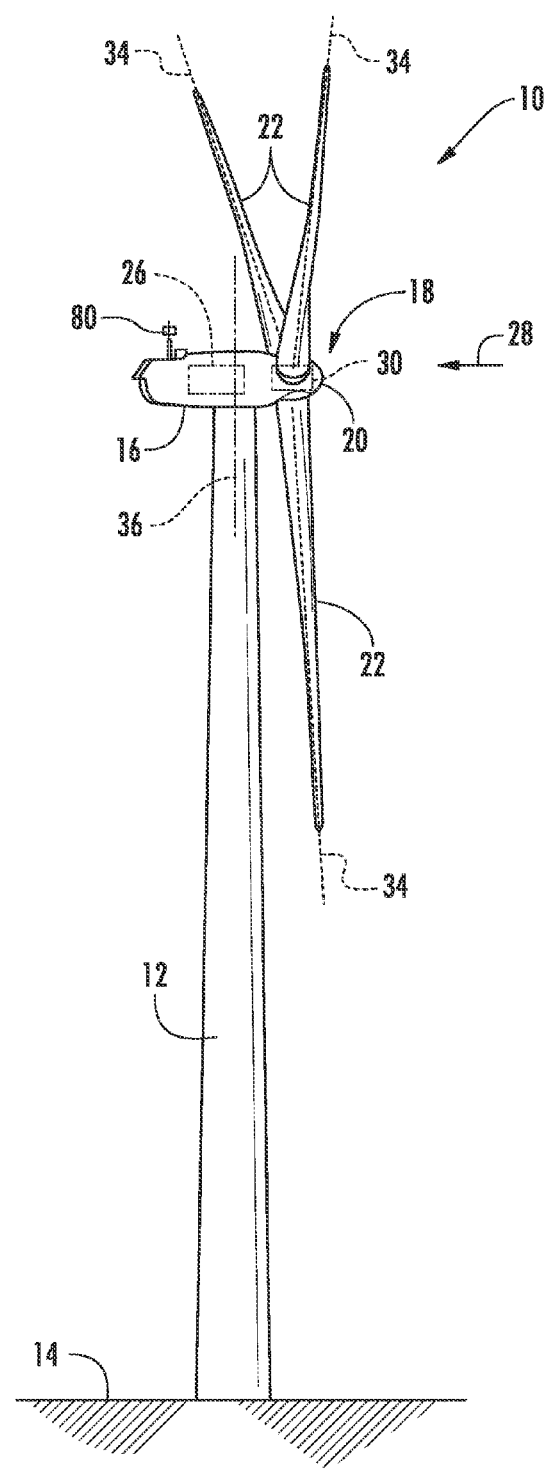
FIG. 1 depicts a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for adjusting operation of a wind turbine control system based on various signals received from sensor (e.g. speed sensors) configured to monitor various parameters. Wind turbine control systems can include a turbine controller configured to receive various signals indicative of operations parameters (e.g. speed signals). These signals can be used by the wind turbine controller to control various operations of the wind turbine. For instance, the speed signals can be used to determine a tip-speed ratio for the wind turbine and to adjust operating conditions of the wind turbine, for instance, by adjusting a pitch angle of one or more rotor blades and/or adjusting generator torque.

In some cases, it can be desirable to modify operation of the turbine controller in response to these speed signals to further increase or enhance energy production of the wind turbine. However, it can be difficult in some cases to access programming (e.g. computer-readable instructions such as source code and source parameters) associated with the turbine controller to make such adjustments.

According to example aspects of the present disclosure, a secondary controller can be provided at a wind turbine. The secondary controller can be external to the wind turbine controller and/or can be separated from the turbine controller by a distance. In example embodiments, the secondary controller can be inserted between one or more sensors configured to generate the signals and the turbine controller. The secondary controller can also receive inputs such as signals indicative of wind speed and/or power (e.g. kilowatts) from the wind turbine control system and can determine an adjustment to the signal(s) based at least in part on the various inputs. The adjusted speed signal(s) can be provided to the turbine controller which can then be used to control operation of the wind turbine.

In example embodiments, the sensor can be a secondary controller can be configured to adjust speed signals received from various speed sensors. The secondary controller can adjust a speed signal to an adjusted speed signal based at least in part on a speed signal bias and provide the adjusted speed signal to a wind turbine controller.

The wind turbine controller can use the adjusted speed signal to control operation of the wind turbine. For instance, the adjusted speed signal can be used by the wind turbine controller to determine a tip speed ratio for the wind turbine. The wind turbine controller can then adjusting loading of one or more rotor blades based at least in part on the tip speed ratio to achieve a desired tip speed ratio for increased energy production. For instance, the wind turbine controller can adjust the pitch angle of one or more rotor blades and/or adjust a generator torque based at least in part on the tip speed ratio. In this way, a tip speed ratio setpoint implemented by the controller can effectively by adjusted by the secondary controller without requiring access or modification of the computer-readable instructions associated with the turbine controller as a result of different speed readings (e.g. the adjusted speed signals) triggering different operational conditions of the wind turbine.

In example implementations, an adjusted signal can be determined to achieve energy production improvement using a signal bias. The signal bias can be different for various input conditions. The input conditions can be based on, for instance, various wind speeds and/or power production of the wind turbine. For instance, a first signal bias can be used for wind speeds below a certain wind speed threshold. A second signal bias can be used for wind speeds above a certain wind speed threshold. The different signal biases for each input condition can be stored in a look up table, matrix, or other correlation stored in a memory at the secondary controller.

The signal bias for each of the input conditions can be programmed into the secondary controller in various ways. In example embodiments, the speed signal bias can be automatically determined when the secondary controller is integrated into the wind turbine control system using an auto-tuning process. For instance, for each of a plurality of input conditions, a secondary controller can incrementally adjust the signal bias among a plurality of incremental values. The secondary controller can monitor various inputs to determine which incremental signal bias provides the greatest or a sufficiently greater improvement in energy production for the particular input condition. This incremental signal bias can be selected as the signal bias for the particular input condition.

Example aspects of the present disclosure will be discussed with reference to a secondary controller configured to adjust a speed signal indicative of a speed of a component of a wind turbine to an adjusted speed signal for purposes of illustration and discussion. Those of ordinary skill in the art, using the disclosures provided herein, will understand that the secondary controller can adjust other types of signals associated with operational conditions of a wind turbine received from different types of sensors without deviating from the scope of the present disclosure.

Referring now to FIG. 1, a perspective view of one embodiment of a wind turbine 10 is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator positioned within the nacelle 16 to permit electrical energy to be produced.

The wind turbine 10 may also include a turbine control system including turbine controller 26 within the nacelle 16 or somewhere else associated with the wind turbine 10. In general, the turbine controller 26 may comprise one or more processing devices. Thus, in several embodiments, the turbine controller 26 may include suitable computer-readable instructions that, when executed by one or more processing devices, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10.

For example, the controller 26 may be configured to control the blade pitch or pitch angle of each of the rotor blades 22 (i.e., an angle that determines a perspective of the rotor blades 22 with respect to the direction 28 of the wind) to control the loading on the rotor blades 22 by adjusting an angular position of at least one rotor blade 22 relative to the wind. For instance, the turbine controller 26 may control the pitch angle of the rotor blades 22, either individually or simultaneously, by transmitting suitable control signals/commands to various pitch drives or pitch adjustment mechanisms 32 (FIG. 2) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32.

Further, as the direction 28 of the wind changes, the turbine controller 26 may be configured to control a yaw direction of the nacelle 16 about a yaw axis 36 to position the rotor blades 22 with respect to the direction 28 of the wind, thereby controlling the loads acting on the wind turbine 10. For example, the turbine controller 26 may be configured to transmit control signals/commands to a yaw drive mechanism 38 (FIG. 2) of the wind turbine 10 such that the nacelle 16 may be rotated about the yaw axis 30.

Figure 2:
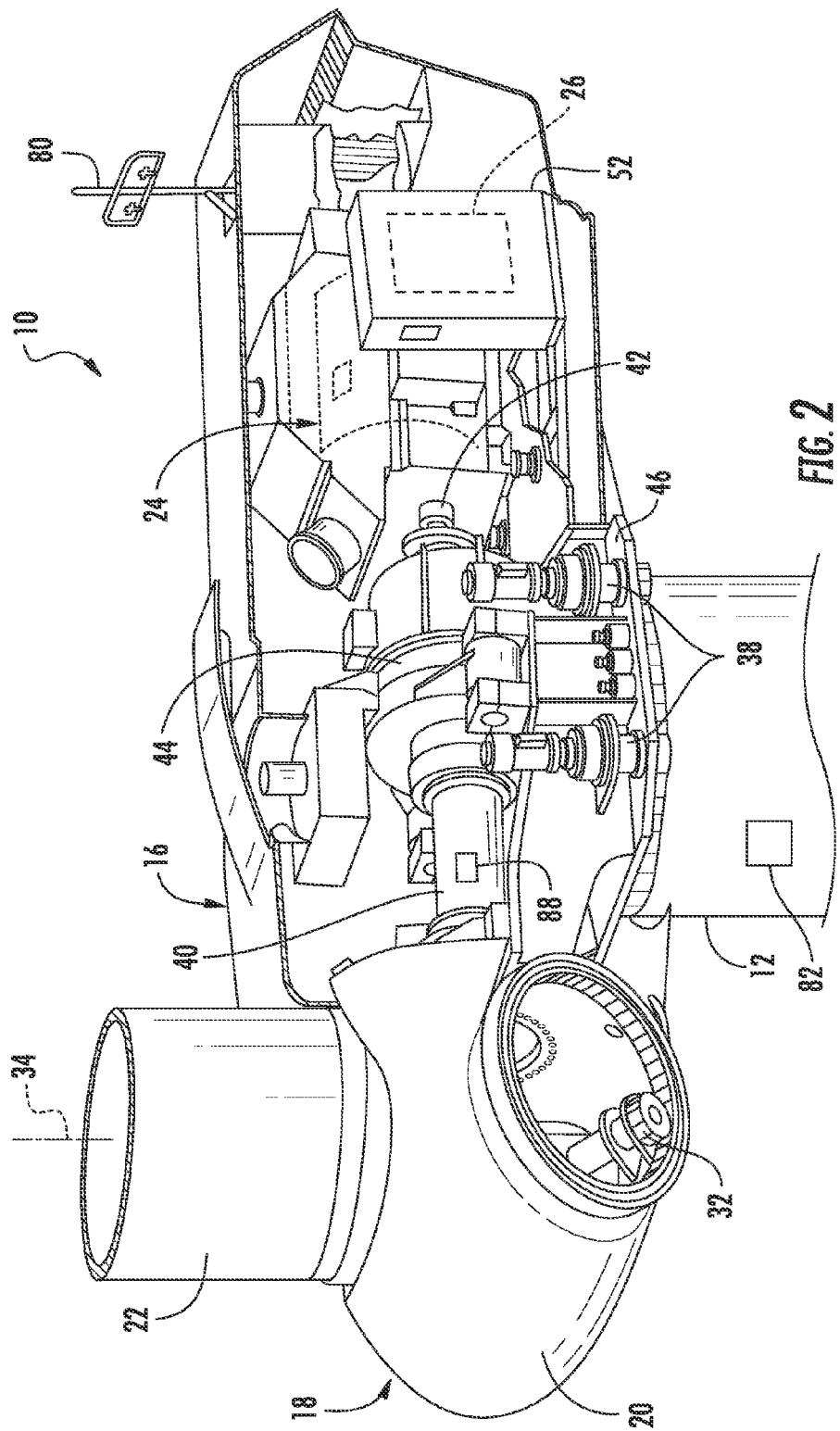
FIG. 2 depicts a perspective, internal view of one embodiment of a nacelle of a wind turbine.

Still further, the turbine controller 26 may be configured to control the torque of a generator 24 (FIG. 2). For example, the turbine controller 26 may be configured to transmit control signals/commands to the generator 24 in order to modulate the magnetic flux produced within the generator 24, thus adjusting the torque demand on the generator 24. Such temporary de-rating of the generator 24 may reduce the rotational speed of the rotor blades 22, thereby reducing the aerodynamic loads acting on the blades 22 and the reaction loads on various other wind turbine 10 components.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine").

It should be appreciated that the rotor shaft 40 may generally be supported within the nacelle by a support frame or bedplate 46 positioned atop the wind turbine tower 12. For example, the rotor shaft 40 may be supported by the bedplate 46 via a pair of pillow blocks mounted to the bedplate 46.

Additionally, as indicated herein, the turbine controller 26 may also be located within the nacelle 16 of the wind turbine 10. For example, as shown in the illustrated embodiment, the turbine controller 26 is disposed within a control cabinet 52 mounted to a portion of the nacelle 16. However, in other embodiments, the turbine controller 26 may be disposed at any other suitable location on and/or within the wind turbine 10 or at any suitable location remote to the wind turbine 10. Moreover, as described herein, the turbine controller 26 may also be communicatively coupled to various components of the wind turbine 10 for generally controlling the wind turbine and/or such components. For example, the turbine controller 26 may be communicatively coupled to the yaw drive mechanism(s) 38 of the wind turbine 10 for controlling and/or altering the yaw direction of the nacelle 16 relative to the direction 28 (FIG. 1) of the wind. Similarly, the turbine controller 26 may also be communicatively coupled to each pitch adjustment mechanism 32 of the wind turbine 10 (one of which is shown) for controlling and/or altering the pitch angle of the rotor blades 22 relative to the direction 28 of the wind. For instance, the turbine controller 26 may be configured to transmit a control signal/command to each pitch adjustment mechanism 32 such that one or more actuators (not shown) of the pitch adjustment mechanism 32 may be utilized to rotate the blades 22 relative to the hub 20.

Example aspects of the present disclosure are further directed to methods for controlling wind turbine 10 based on speed signals, for instance, by determining a tip speed ratio of the wind turbine 10. Tip speed ratio is the ratio of the rotational velocity of the blade tip to wind speed. The tip speed ratio of the wind turbine may be determined, for instance, based at least in part on various speed signals provided by speed sensors indicative of the speed of various components (e.g. shafts, rotor blades, etc.) of the wind turbine 10 as well as signals indicative of wind speed (e.g. from sensor 80). For instance, tip speed ratio may generally be calculated by multiplying the current rotational speed of the wind turbine 10 as measured by a speed sensor (such as the rotor 18 thereof) by the maximum radius of the rotor 18, and dividing this result by the wind speed. In particular, controller 26 may be utilized to perform such methods, and may control torque adjustment of the generator 24 and/or pitch adjustment of the rotor blades 22 based on such methods in order to control loading on the rotor blades 22 and the wind turbine 10 in general to increase energy production.

Figure 3:
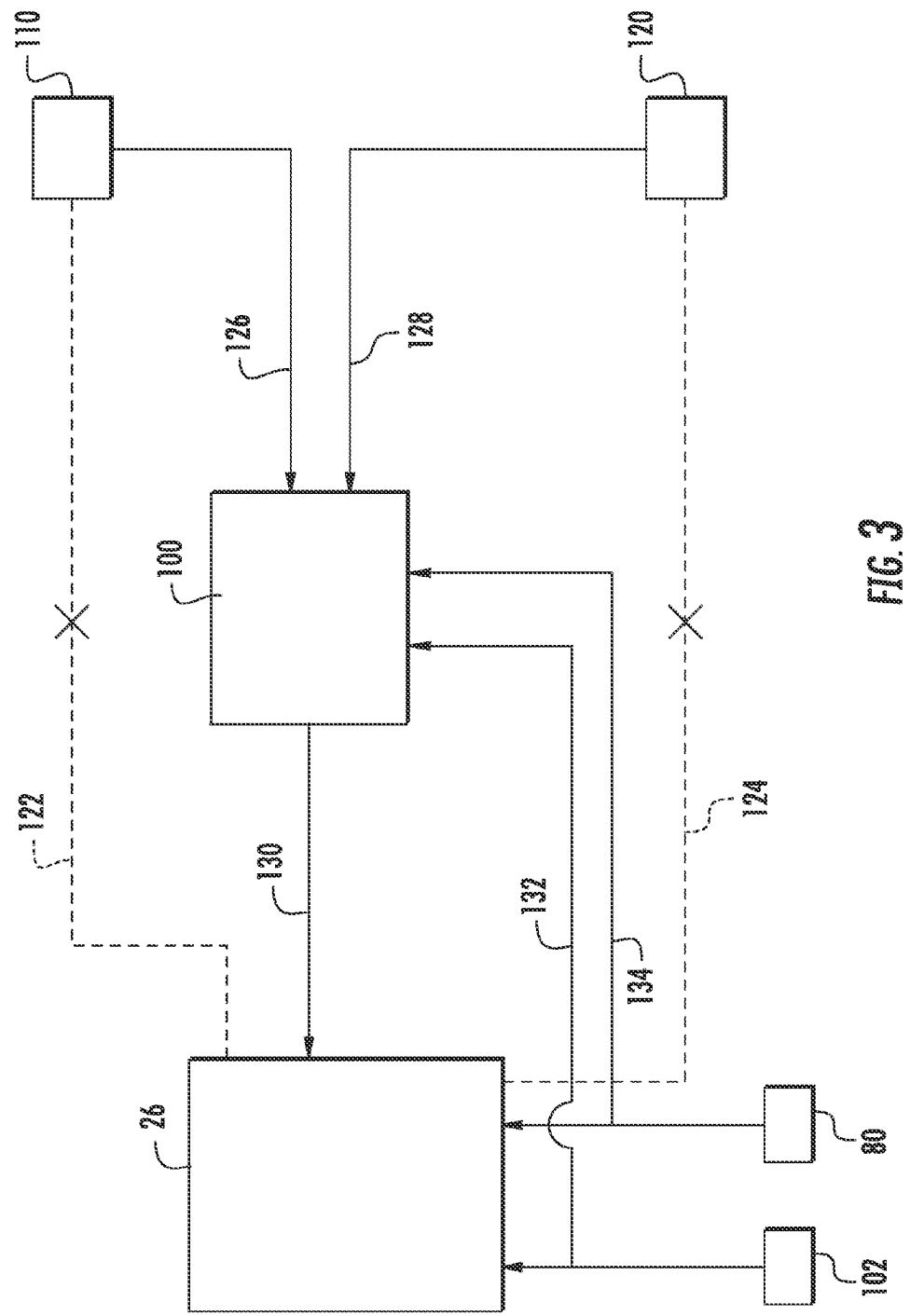
FIG. 3 depicts an example control system according to example embodiments of the present disclosure.

FIG. 3 depicts a control system for a wind turbine, such as wind turbine 10 of FIG. 1, according to example embodiments of the disclosure. As shown, the control system 10 includes a wind turbine controller 26. The turbine controller 26 can include computer-readable instructions that when executed by one or more processors cause the one or more process to implement various control routines, such as determination of tip speed ratio and controlling loading of the wind turbine 10 based on tip speed ratio. In some embodiments, the computer-readable instructions associated with the turbine controller 26 can be inaccessible or otherwise unavailable. For instance, the turbine controller 26 may have been installed and/or configured by a different service provider.

The control system can further include various speed sensors 110 and 120 configured to measure a speed associated with various components of the wind turbine. For instance, speed sensor 110 can be configured to measure a rotational speed of a rotor shaft of the wind turbine 10. Speed sensor 120 can be configured to measure a rotational speed of a generator shaft of the wind turbine 10. Speed sensors 110 and 120 can include any suitable sensors or components for measuring speed, such as one or more encoders, proximity sensors, transducers, resolvers, or the like. Two speed sensors 110 and 120 are illustrated in FIG. 3 for purposes of illustration and discussion. Those of ordinary skill in the art, using the disclosures provided herein, will understand that more or fewer speed sensors can be used without deviating from the scope of the present disclosure.

To adjust the operation of the turbine controller 26 without requiring access to the computer-readable instructions associated with the turbine controller, signal paths 122 and 124 for communicating speed signals from the speed sensors 110 and 120 can be broken. A secondary controller 100 can be inserted in a new signal path between the wind turbine controller 26 and the speed sensors 110 and 120.

The secondary controller 100 can be separated from the wind turbine controller 26 by a distance (e.g. 1 m, 1 cm or less, 2 m or more, or other suitable distance). In addition, the secondary controller 100 can be located in a separate housing and/or can include one or more components (e.g. processors, memory devices, etc.) that are different from the components of the wind turbine controller 26. In embodiments, the secondary controller 100 can use different computer-readable instructions stored in a different language or protocol relative to the turbine controller 26. In this way, the secondary controller 100 can be a standalone and separate device from the turbine controller 26.

The secondary controller 100 can be configured to receive a speed signal from the speed sensor 110 via a signal path 126. The secondary controller 100 can be configured to receive a speed signal from the speed sensor 120 via a signal path 128. As used herein, a signal path can include any suitable communication medium for transmitting the signals. For instance, a signal path can include any number of wired or wireless links, including communication via one or more Ethernet connections, fiber optic connections, network buses, power lines, conductors, or circuits for transmitting information wirelessly. Signals can be communicated over a signal path using any suitable communication protocol, such as a serial communication protocol, broadband over power line protocol, wireless communication protocol, or other suitable protocol.

The secondary controller 120 can also receive one or more signals associated with various input conditions. The input conditions can be representative of power production for the wind turbine, wind speed conditions for the wind turbine, and/or other suitable parameters. For example, the secondary controller 100 can receive a signal from sensor 102 over signal path 132. The sensor 102 can be a sensor associated with the electrical system of the wind turbine that provides signals indicative of the power production of the wind turbine. The secondary controller 100 can also receive a signal from sensor 80 over signal path 134. The sensor 80 can be a sensor configured to provide signals indicative of wind speed, such as an anemometer or other suitable method or apparatus.

For example, the wind speed of the wind turbine 10 may be measured, such as through use of a suitable weather sensor. Suitable weather sensors include, for example, Light Detection and Ranging ("LIDAR") devices, Sonic Detection and Ranging ("SODAR") devices, anemometers, wind vanes, barometers, and radar devices (such as Doppler radar devices). In still other alternative embodiments, sensors may be utilized to measure the deflection of the rotor blades 22. This deflection may be correlated to the wind speed to which the rotor blades 22 are subjected. Still further, any suitable measurement methods and apparatus may be utilized to directly or indirectly measure the current wind speed.

The secondary controller 100 can be configured to adjust the speed signals received from the speed sensors 110 and 120 to an adjusted speed signal based on a speed signal bias. The speed signal bias can be, for instance, 1 or 2 rpm. An adjusted speed signal can be determined, for instance, by adding or subtracting the speed signal bias from a speed signal.

In particular implementations, the secondary controller 100 can be configured to determine an adjusted speed signal based at least in part on the input condition (e.g. wind speed) as determined from, for instance, the signals received from the sensors 102 and 80. For instance, different signal bias values can be associated with different input conditions. The signal bias values for each input condition can be determined, for instance, using an auto-tuning process. Example methods for programming different signal bias values for different input conditions into the secondary controller 100 will be discussed in more detail below.

Once determined, the adjusted speed signals can be communicated by the secondary controller 100 to the turbine controller 26 over signal path 130. The turbine controller 26 can use the adjusted speed signals to control various operations of the wind turbine. For instance, in some embodiments, the turbine controller 26 can calculate a tip speed ratio based on the adjusted speed signal (e.g. based on speed signal from sensor 110), a radius of the rotor blade, and a signal indicative of wind speed as determined, for instance, from the sensor 80. The turbine controller 26 can be configured to adjust operation of the wind turbine 10 based at least in part on the tip speed ratio, for instance, by pitching the rotor blades and/or adjusting the torque of the generator 24.

The present disclosure has been discussed with reference to adjusting operation of a wind turbine based on tip speed ratio for purposes of illustration and discussion. Those of ordinary skill in the art, using the disclosures provided herein, will understand that example aspects of the present disclosure are applicable to other control routines that can be implemented by the turbine controller 26 based on various speed signals received from, for instance, sensors 110, 120, or other speed sensors.

In particular implementations, the speed sensors 110, 120 and other speed sensors can be in communication with a safety chain that monitors various turbine conditions based on the speed signals provided by speed sensors 110, 120. The safety chain can take actions to prevent damage to the wind turbine (e.g. send alerts, adjust operation to prevent overspeed/underspeed conditions, etc.) based at least in part on the speed readings from the speed sensors 110, 120. In example embodiments, a signal path coupling the speed sensors 110, 120 to the safety chain can be preserved such that the secondary controller 100 does not adjust the speed signals provided to the safety chain.

Figure 4:
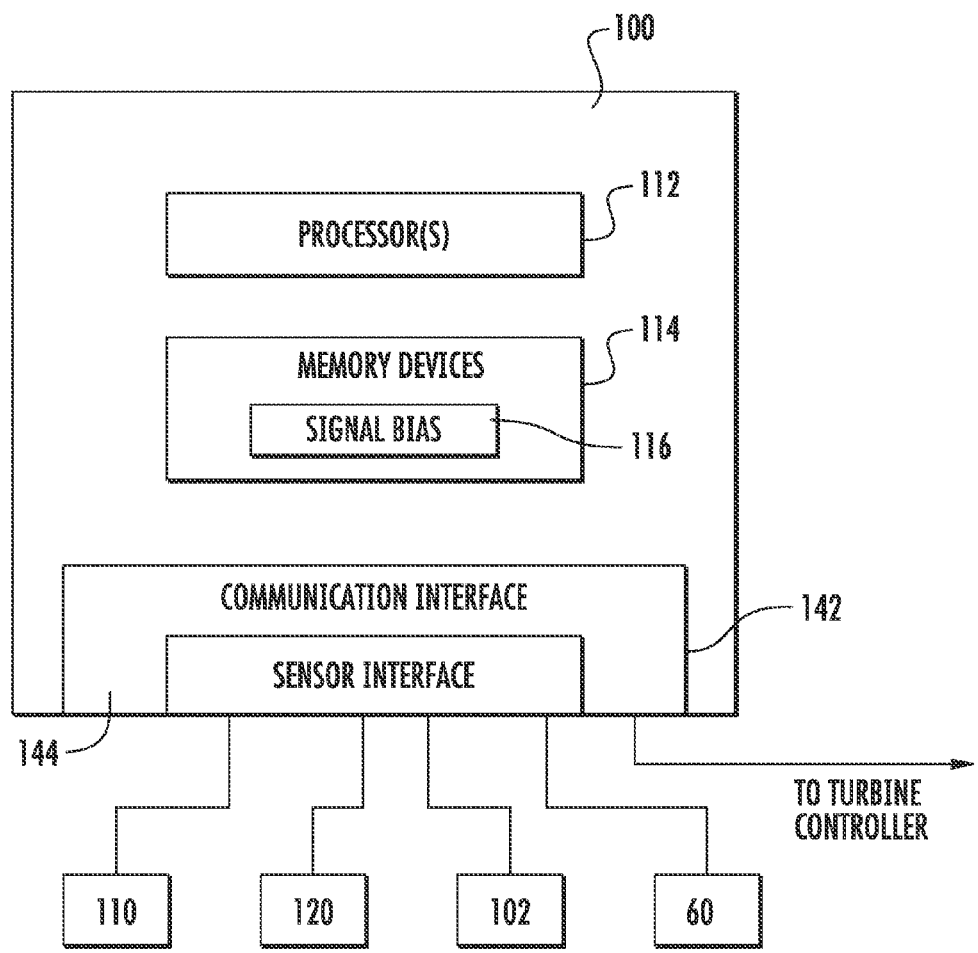
FIG. 4 illustrates a schematic diagram of one embodiment of a secondary controller for a wind turbine according to example embodiments of the present disclosure.

Referring now to FIG. 4, there is illustrated a block diagram of one embodiment of suitable components that may be included within the secondary controller 100 (or the turbine controller 26) in accordance with example aspects of the present disclosure. As shown, the secondary controller 100 may include one or more processor(s) 112 and associated memory device(s) 114 configured to perform a variety of computer-implemented functions (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 114 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 114 may generally be configured to store suitable computer-readable instructions that, when implemented by the processor(s) 112, configure the secondary controller 100 to perform various functions including, but not limited to, receiving directly or indirectly signals from one or more sensors (e.g. wind speed sensors, speed sensors) indicative of various input conditions, determining adjusted speed signals, and/or transmitting adjusted speed signals to a turbine controller 26, and various other suitable computer-implemented functions.

As illustrated, the memory device(s) 114 can also store a speed signal bias 116. The speed signal bias 116 can be used to offset the speed signal received from one or more sensors to determine an adjusted speed signal. In particular implementations, a different speed signal bias 116 can be associated with each of a plurality of input conditions. The speed signal bias 116 can be programmed into the memory device(s) 114 in any suitable manner. In one example embodiment, the speed signal bias 116 can be automatically programmed into the memory device(s) 114 using an auto-tuning process as will be discussed in more detail below.

Additionally, the secondary controller 100 may also include a communications interface 142 to facilitate communications between the secondary controller 100 and the various components of the wind turbine 10. An interface can include one or more circuits, terminals, pins, contacts, conductors, or other components for sending and receiving control signals. Moreover, the secondary controller may include a sensor interface 144 (e.g., one or more analog-to-digital converters) to permit signals transmitted from the sensors (e.g. sensors 80, 102, 110, and 120) to be converted into signals that can be understood and processed by the processors 112.

Figure 5:
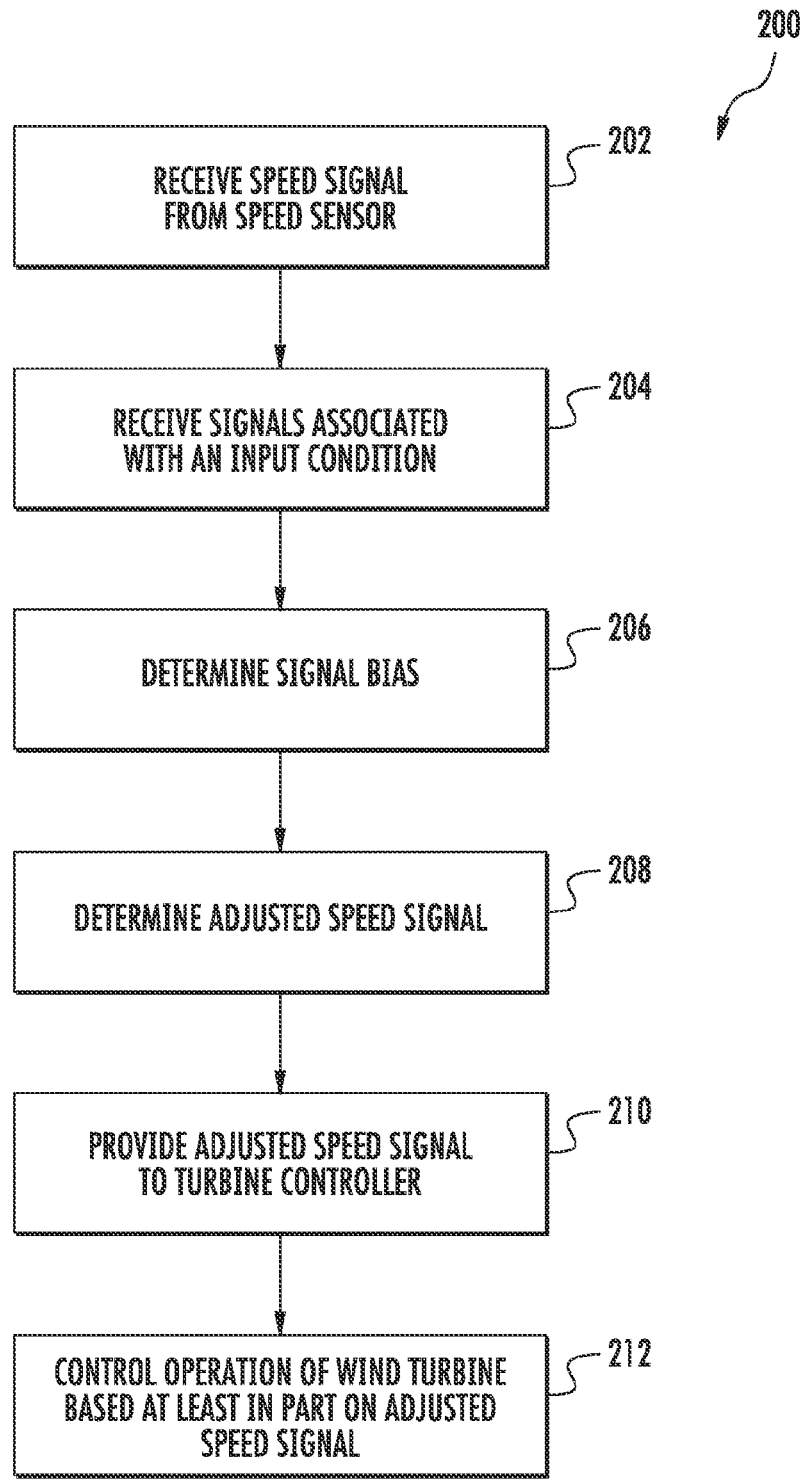
FIG. 5 depicts a flow diagram of an example method for controlling a wind turbine according to example embodiments of the present disclosure.

FIG. 5 depicts a flow diagram of an example method (200) for controlling a wind turbine according to example embodiments of the present disclosure. The method (200) can be implemented using one or more control devices, such as one or more of the controllers depicted in FIG. 3. In addition, FIG. 5 depicts steps performed in a particular order for purposes of illustration and discussion. Those of ordinary skill in the art, using the disclosures provided herein, will understand that the steps of any of the methods disclosed herein can be modified, expanded, omitted, rearranged, and/or adapted in various ways without deviating from the scope of the present disclosure.

At (202), the method includes receiving a speed signal at a secondary controller from a speed sensor. For instance, the secondary controller 100 of FIG. 3 can receive a speed signal indicative of the speed of one or more components of the wind turbine from speed sensor 110 and/or speed sensor 120. At (204) of FIG. 5, one or more signals associated with an input condition can be received. For instance, the secondary controller 100 can receive signals from various sensors, such as sensor 102 and sensor 80. The input condition can be a particular level of power production, a particular wind speed, or combination. The input condition can also be based on other suitable parameters without deviating from the scope of the present disclosure.

At (206), a signal bias can be accessed. For instance, a speed signal bias programmed into a memory device 114 associated with or in communication with the secondary controller 100 can be accessed. In example embodiments, different speed signal bias values can be associated with different input conditions. For instance, a first speed signal bias can be associated with wind speeds below a threshold. A second speed signal bias can be associated with speeds above a threshold.

Figure 6:
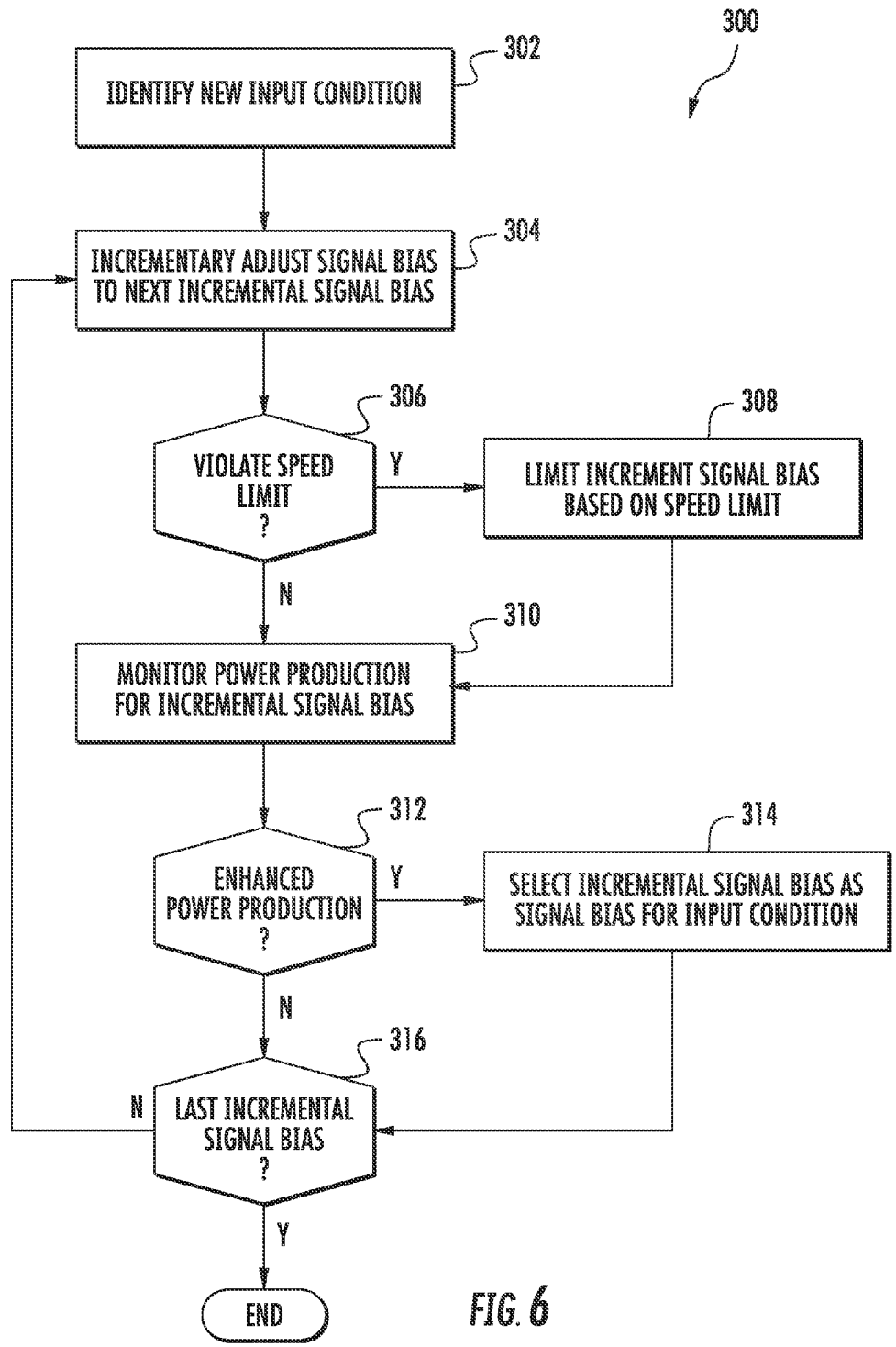
FIG. 6 depicts a flow diagram of an example auto-tuning process for determining a signal bias for a secondary controller according to example embodiments of the present disclosure.

According to example aspects of the present disclosure, the speed signal bias can be programmed into the secondary controller using an auto-tuning process. FIG. 6 depicts a flow diagram of one example auto-tuning process. The auto-tuning process can be performed at any suitable time, such as when a secondary controller is first implemented in the control system and/or at periodic intervals. Generally, the auto-tuning process includes incrementally adjusting the signal bias among a plurality of incremental speed signal bias values (e.g. ±0.5 rpm, ±1.0 rpm, ±1.5 rpm, ±2.0 rpm, ±2.5 rpm, etc.). Any suitable number of incremental speed signal bias values can be used without deviating from the scope of the present disclosure. Power production of the wind turbine can be monitored at each of the plurality of different incremental speed signal bias values. The signal bias value for the input condition can be selected based at least in part on the power production associated with each incremental speed signal bias value such that the incremental speed signal bias value associated with the most improved and/or enhanced power production is selected as the speed signal bias value for the input condition.

More particularly at (302), a new input condition can be identified. For instance, based on signals received from sensors 102 and 80, the secondary controller 100 can identify that a new input condition is present (e.g. a new wind speed). At (304), the method can include incrementally adjusting the speed signal bias value to a next incremental speed signal bias value. At (306) it is determined whether the incremental speed signal bias value results in a violation of a speed constraint (e.g. an overspeed limit or underspeed limit) associated with the wind turbine. If so, the auto-tuning process includes limiting the incremental speed signal bias to a value that does not violate the speed constraint (308).

The auto-tuning process proceeds to (310) where the power production at the incremental speed signal bias can be monitored (306). It can then be determined whether the power production at the incremental speed signal bias is improved or enhanced at (312). If not, it is then determined whether the incremental speed signal bias is the last speed signal bias in the plurality of incremental speed signal bias values (316). If so the method terminates. Otherwise, the auto-tuning process returns to (304) where the speed signal bias is incrementally adjusted to the next incremental speed signal bias value.

If the power production is improved or enhanced at (312), the incremental speed signal bias is selected as the speed signal bias for the input condition (310). It is then determined whether incremental speed signal bias is the last incremental speed signal bias in the plurality of incremental speed signal bias value (312). If so the method terminates. Otherwise, the method return to (304) where the speed signal bias is incrementally adjusted to the next incremental speed signal bias value. This process repeats itself until all incremental speed signal bias values in the plurality of incremental speed signal bias values have been tested.

FIG. 6 depicts one example method for programming a speed signal bias into a secondary controller according to example aspects of the present disclosure. Other suitable methods can be used without deviating from the scope of the present disclosure. For instance, in other implementations, the speed signal bias can be manually programmed into the secondary controller.

Referring back to FIG. 5 at (208), the method can include determining an adjusted speed signal based at least in part on the speed signal. For instance, the speed signal bias corresponding to the input condition can be added or subtracted by the secondary controller 100 to determine the adjusted speed signal.

At (210), the adjusted speed signal is communicated to the turbine controller. For instance, the adjusted speed signal can be communicated by the secondary controller 100 over the signal path 130 to the turbine controller 26. At (212) the turbine controller can control operation of the wind turbine based at least in part on the adjusted speed signal.

For instance, in one example implementation, the wind turbine controller can determine a tip speed ratio based at least in part on the adjusted speed signal. The wind turbine controller can adjust loading of the rotor blades of the wind turbine based at least in part on the tip speed ratio. For instance, the wind turbine controller can adjust the pitch angle of one or more rotor blades based at least in part on the tip speed ratio to increase or decrease loading of the turbine blades. In addition and/or in the alternative, the wind turbine controller can adjust the torque of generator to adjust the speed of the rotor blades.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for controlling a wind turbine, comprising:
a sensor configured to provide a signal indicative of one or more parameters of the wind turbine;
a turbine controller configured to control operations of the wind turbine;
a secondary controller inserted between the sensor and the turbine controller, the secondary controller separated from the turbine controller by a distance, the secondary controller configured to receive the signal from the sensor over a communication interface;
wherein the secondary controller is configured to adjust the signal based at least in part on a signal bias to an adjusted signal and to provide the adjusted signal to the turbine controller,
wherein the signal bias is programmed into the secondary controller using an auto tuning process, the auto-tuning process comprising:
for each of a plurality of input conditions,
incrementally adjusting the signal bias among a plurality of incremental signal bias values;
monitoring power production of the wind turbine at each of the plurality of incremental signal bias values; and
selecting the signal bias for the input condition from the plurality of incremental signal bias values based at least in part on the power production associated with each of the plurality of incremental signal bias values.

2. The system of claim 1, wherein the secondary controller is configured to adjust the signal without accessing computer-readable instructions implemented by the turbine controller.

3. The system of claim 1, wherein the secondary controller is located in a housing that is external to the turbine controller.

4. The system of claim 1, wherein the signal is a speed signal received from a speed sensor.

5. The system of claim 4, wherein the turbine controller is configured to adjust a pitch angle of one or more rotor blades or to adjust a generator torque based at least in part on the adjusted signal.

6. The system of claim 1, wherein the secondary controller comprises an interface configured to receive one or more input signals, the secondary controller configured to determine the signal bias based at least in part on the one or more input signals.

7. The system of claim 6, wherein the one or more input signals comprise a signal indicative of power or wind speed.

8. The system of claim 6, wherein the signal bias is determined from a look up table associating a signal bias value with each of a plurality of input conditions.

9. The system of claim 1, wherein the auto-tuning process further comprises limiting the signal bias based at least in part on one or more operational limits for the wind turbine.

10. A method for controlling a wind turbine, the wind turbine comprising a sensor in communication with a wind turbine controller over a signal path, the method comprising:
modifying the signal path between the sensor and the wind turbine controller;
inserting a secondary controller between the sensor and the wind turbine controller;
generating a signal indicative of parameter of the wind turbine with the sensor;
receiving the signal at the secondary controller;
determining, at the secondary controller, an adjusted signal that is different from the signal based at least in part on a signal bias; and
providing the adjusted signal to the wind turbine controller,
wherein the signal bias is programmed into the secondary controller using an auto tuning process, the auto-tuning process comprising:
for each of a plurality of input conditions,
incrementally adjusting the signal bias among a plurality of incremental signal bias values;
monitoring power production of the wind turbine at each of the plurality of incremental signal bias values; and
selecting the signal bias for the input condition from the plurality of incremental signal bias values based at least in part on the power production associated with each of the plurality of incremental signal bias values.

11. The method of claim 10, wherein the method comprises determining, by the wind turbine controller, a tip speed ratio or a rotational speed based at least in part on the adjusted signal.

12. The method of claim 11, wherein the method comprises adjusting a pitch angle associated with the one or more rotor blades.

13. The method of claim 11, wherein adjusting a generator torque associated with the wind turbine.

14. The method of claim 11, wherein the method further comprises
receiving one or more signals associated with an input condition at the secondary controller; and
determining, by the secondary controller, the signal bias based at least in part on the input condition.

15. The method of claim 10, wherein the auto-tuning process further comprises limiting the signal bias based at least in part on the one or more operational restraints associated with the wind turbine.

16. A secondary controller for adjusting a speed signal provided by a speed sensor for communication to a wind turbine controller, the secondary controller comprising:
a first interface configured to receive a speed signal indicative of a speed of one or more components of a wind turbine;
a second interface configured to receive one or more signals associated with an input condition;
one or more processors; and
one or more memory devices, the one or more memory devices storing computer readable instructions that when executed by the one or more processors cause the one or more processors to perform operations, the operations comprising:
receiving the speed signal via the first interface;
receiving one or more signals associated with the input condition via the second interface;
determining an adjusted speed signal that is different from the speed signal based at least in part on the input condition; and
providing the adjusted signal to the wind turbine controller,
wherein the signal bias is programmed into the secondary controller using an auto tuning process, the auto-tuning process comprising:
for each of a plurality of input conditions,
incrementally adjusting the signal bias among a plurality of incremental signal bias values;
monitoring power production of the wind turbine at each of the plurality of incremental signal bias values; and
selecting the signal bias for the input condition from the plurality of incremental signal bias values based at least in part on the power production associated with each of the plurality of incremental signal bias values.

17. The secondary controller of claim 16, wherein the secondary controller further comprises a third interface in communication with a turbine controller, the operations further comprising providing the adjusted speed signal to the turbine controller.

* * * * *